United States Patent
Stausberg et al.

(10) Patent No.: US 9,975,070 B2
(45) Date of Patent: May 22, 2018

(54) FILTER WITH MULTIPLE MEDIA

(71) Applicant: IBS Filtran Kunststoff-/Metallerzeugnisse GmbH, Morsbach-Lichtenberg (DE)

(72) Inventors: Wolfgang Stausberg, Morsbach (DE); Michael Dedering, Morsbach (DE); Robert Morgenstern, Waldbrol (DE); Joerg Klueser, Friesenhagen (DE)

(73) Assignee: IBS FILTRAN KUNSTSTOFF-METALLERZEUGNISSE GMBH, Morbach (DE)

( * ) Notice: Subject to any disclaimer, the term of this patent is extended or adjusted under 35 U.S.C. 154(b) by 777 days.

(21) Appl. No.: 14/460,053

(22) Filed: Aug. 14, 2014

(65) Prior Publication Data

US 2016/0045845 A1    Feb. 18, 2016

(51) Int. Cl.
*B01D 35/00* (2006.01)
*B01D 35/027* (2006.01)
*B01D 29/52* (2006.01)

(52) U.S. Cl.
CPC .......... *B01D 35/005* (2013.01); *B01D 29/52* (2013.01); *B01D 35/0273* (2013.01)

(58) Field of Classification Search
CPC ... B01D 35/005; B01D 29/52; B01D 35/0273
USPC .......... 210/488–490, 492, 483, 295, 167.04, 210/167.08, 172.4, 416.5
See application file for complete search history.

(56) References Cited

U.S. PATENT DOCUMENTS

| | | | |
|---|---|---|---|
| 5,569,373 A | | 10/1996 | Smith et al. |
| 5,817,236 A | * | 10/1998 | Chiba ................ B01D 35/0273 210/344 |
| 7,087,160 B2 | * | 8/2006 | Beer .................. B01D 35/0273 156/580.1 |
| 7,163,625 B1 | * | 1/2007 | Williamson ....... B01D 39/1615 210/315 |
| 2003/0042185 A1 | | 3/2003 | Dockery |
| 2009/0184036 A1 | | 7/2009 | Martin et al. |
| 2009/0294343 A1 | | 12/2009 | Pekarsky et al. |
| 2011/0180469 A1 | * | 7/2011 | Sato ................... B01D 35/0273 210/172.4 |

(Continued)

FOREIGN PATENT DOCUMENTS

EP    1698387    9/2006

OTHER PUBLICATIONS

International Search Report and Written Opinion from corresponding PCT Appln. No. PCT/EP2015/056548 dated Feb. 18, 2016. English translation attached.

(Continued)

*Primary Examiner* — Madeline Gonzalez
(74) *Attorney, Agent, or Firm* — Grossman, Tucker, Perreault & Pfleger, PLLC

(57) ABSTRACT

A filter is provided having more than one density of media, or more than one type of media. Three or four types of media may be arranged. Some or all of the media may be of different density material from each other. A spacer grid separates at least two of the media apart. One or more flanges on the spacer each respectively space apart two of the media from each other at a location. The one or more flanges provide a respective flow path through the flange.

18 Claims, 10 Drawing Sheets

(56) References Cited

U.S. PATENT DOCUMENTS

2012/0012517 A1  1/2012  Khalil et al.
2012/0285901 A1  11/2012 Holm et al.

OTHER PUBLICATIONS

English translation of Office Action from related Korean Appln. No. 10-2017-7007016, dated Mar. 19, 2018.

* cited by examiner

FILTER WITH MULTIPLE MEDIA

FIELD

Various embodiments of the invention pertain to fluid filters, including for example filters for vehicle fluids such as oils such as transmission fluid oils.

BACKGROUND

Vehicle parts such as engines and transmissions are often used with various oils or other internal fluids. Various filters are known to remove contaminants or other materials from the fluids. In the case of transmissions, for example, filters having a housing that encloses a filter media such as a felt-like media are used, with the fluid passing through the media under pressure or suction applied to the filter on the inlet or outlet side.

An example of a filter is described in US20120012517A1.

When the fluid is at a colder temperature, some fluids become highly viscous and thus may create a large pressure drop compared to warm operation.

SUMMARY OF THE INVENTION

Accordingly, some embodiments provide a filter having more than one density of media, or more than one type of media. Some embodiments provide three types of media. In some embodiments the three types of media are each in the form of respective flat sheets. Some embodiments provide two types of medial each in the form of bags. Some embodiments provide four or more types of media. Some embodiments involve a spacer grid to separate at least two of the media apart. Some embodiments have one or more flanges on the spacer that each respectively space apart two of the media from each other at a location. In some embodiments the one or more flanges provide a respective flow path through the flange.

In one aspect, a filter is provided having a housing having an inlet and an outlet: and a first media having a first aperture therethrough; a second media having a second aperture therethrough; a third media having a third aperture therethough; a first mounting flange spacing the first and second media apart a second mounting flange spacing the first and third media apart; a third mounting flange spacing the second and third media apart, wherein the first and third flanges form a flow channel from the inlet to a fluid space between the second and third media and the second and third flanges form a flow channel from a fluid space between the first and second media to the outlet.

In another aspect, a fluid filter is provided having a housing having an inlet and an outlet; and three or more layers of media disposed inside of the housing.

In another aspect, a filter is provided having a housing having an inlet and an outlet, multiple layers of different media grades arranged internally to the housing; and multiple spacer grids each fitted with internal flow channels for flow distribution between the different medias.

A benefit of some embodiments described in this application is that the resulting filter structure according to certain embodiments optimizes the pressure drop distribution, which is achieved by shorter fluid tracks and fluid paths than in prior systems. For example these embodiments of the invention may provide a better pressure drop distribution compared to a single bag filter system, or the bag system with a single layer as described in US20120012517A1.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

Some embodiments provide a filter having more than one density of media, or more than one type of media. Some embodiments provide three types of media. In some embodiments the three types of media are each in the form of respective flat sheets. Some embodiments provide two types of medial each in the form of bags. Some embodiments provide four or more types of media. Some embodiments involve a spacer grid to separate at least two of the media apart. Some embodiments have one or more flanges on the spacer that each respectively space apart two of the media from each other at a location. In some embodiments the one or more flanges provide a respective flow path through the flange.

A benefit of some embodiments described in this application is that the resulting filter structure according to certain embodiments optimizes the pressure drop distribution, which is achieved by shorter fluid tracks and fluid paths than in prior systems. For example these embodiments of the invention may provide a better pressure drop distribution compared to a single bag filter system, or a bag system with a single layer.

In the following description, certain terminology is used to describe certain features of one or more embodiments of the invention. Some embodiments will now be described by way of example, with like reference numbers referring to like parts throughout.

Figure 1:
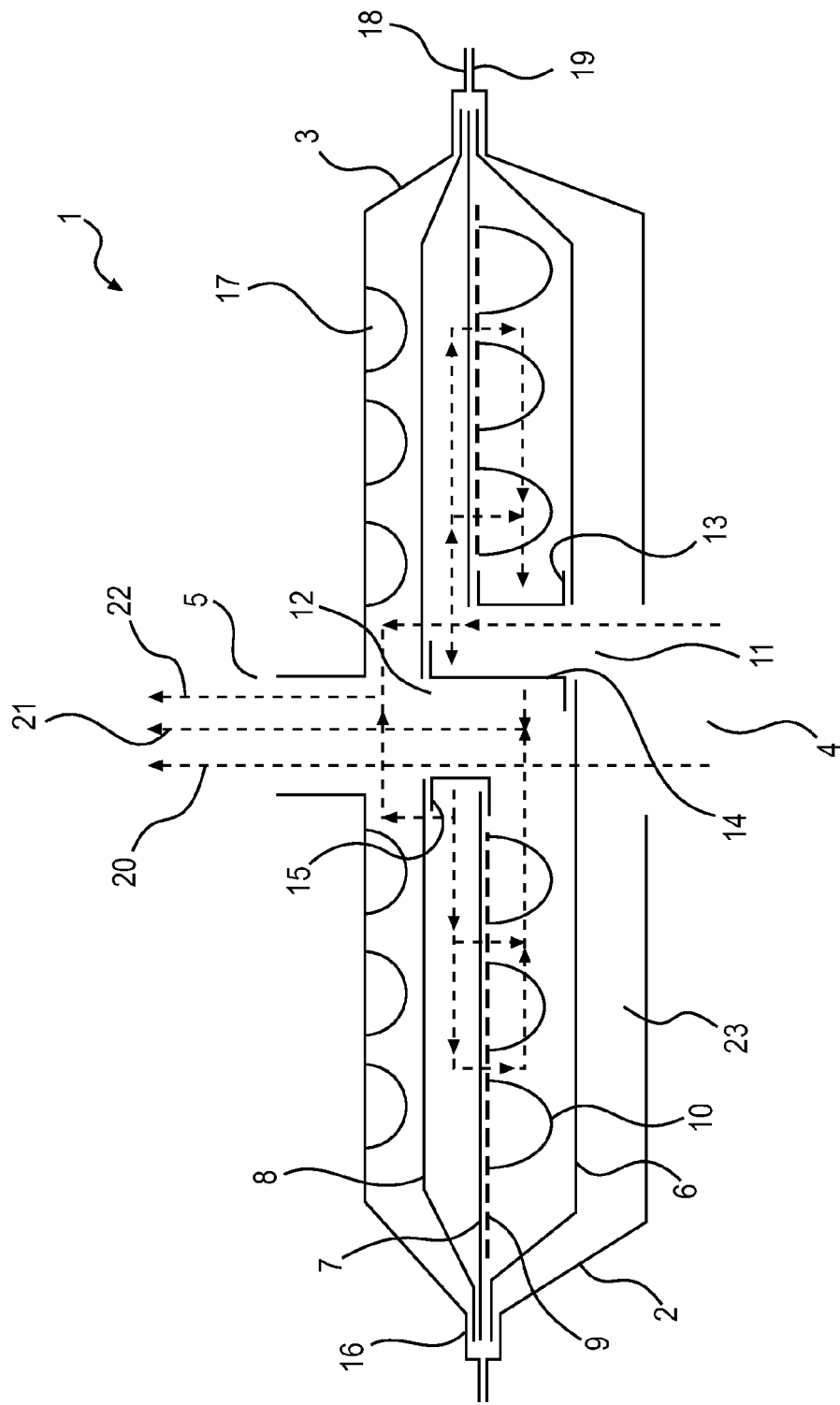
FIG. 1 is a side cross-sectional schematic view of a filter according to a first embodiment.

FIG. 1 is a side cross-sectional schematic view of a filter according to a first embodiment. The filter apparatus 1 has a base cover 2 and an upper cover 3 which together form a housing enclosure. The housing has a fluid inlet 4 and a fluid outlet 5. Arranged inside the housing in this example are three sheets of filter material or filter media 6, 7, 8. The media 6, 7, 8 need not be of the same density or fineness. That is the media 6 may be relatively coarse, the media 7 intermediately coarse, and the media 8 relatively fine. Alternatively, any two media 6, 7, 8 may be of the same density. An advantage of the three media being of different density material is that different flow patterns will occur depending of the viscosity of the fluid being filtered. For example, if the fluid is cold and relatively viscous, more fluid may tend to flow through the more coarse media; while when the fluid is warm and relatively less viscous, more fluid may tend to flow through the more fine media. As the fluid gradually changes temperature from a cold to warm state due to vehicle heating up, the ratio of fluid passing through each relative media 6, 7, 8 will gradually change. In this embodiment, no fluid ever is completely unfiltered; even in the coldest state the fluid with pass through the third (and most coarse) media 8.

Figure 2:
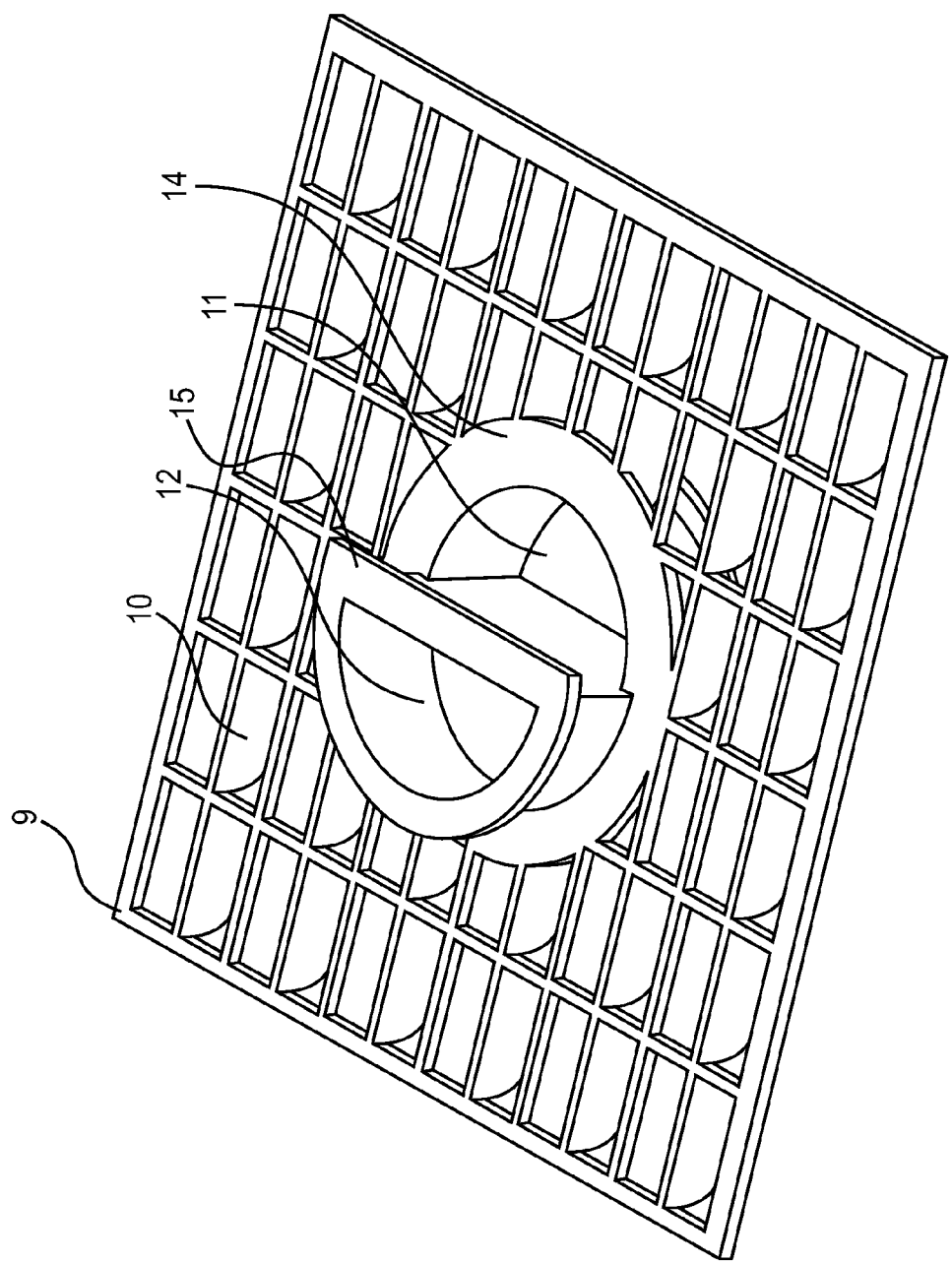
FIG. 2 is a perspective view of a first embodiment of a spacer grid with flanges.
Figure 3:
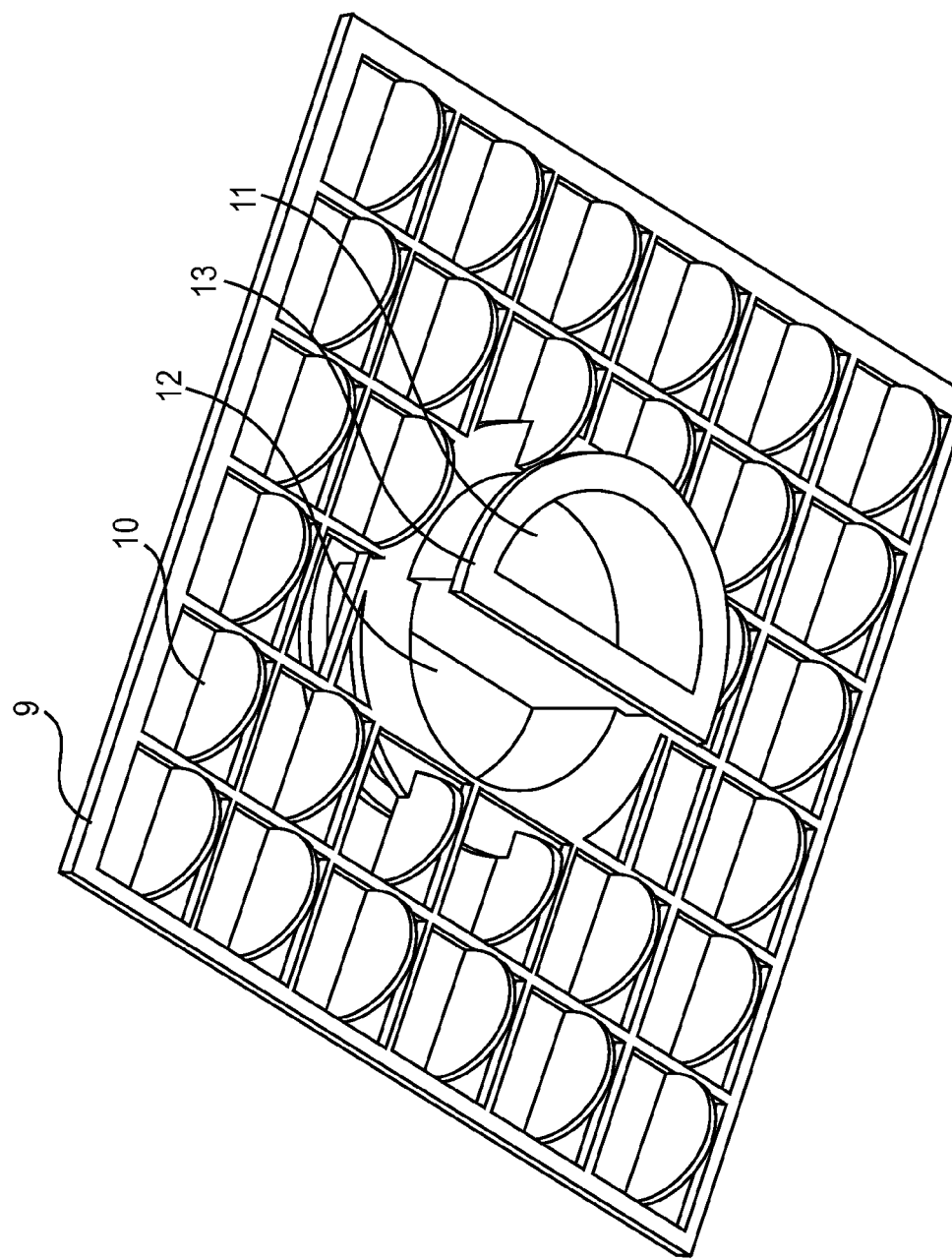
FIG. 3 is a perspective view of a first embodiment of a spacer grid with flanges, taken from the opposite side as FIG. 2.
Figure 4:
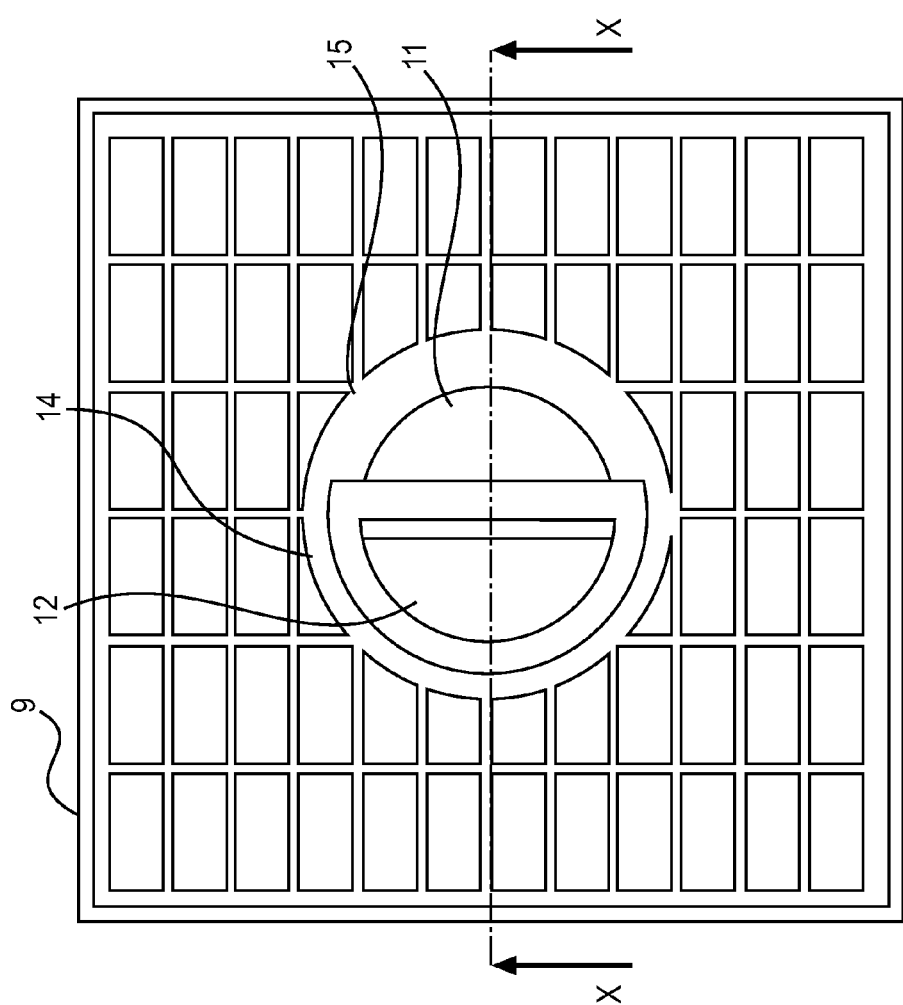
FIG. 4 is a top view of the spacer grid.
Figure 5:
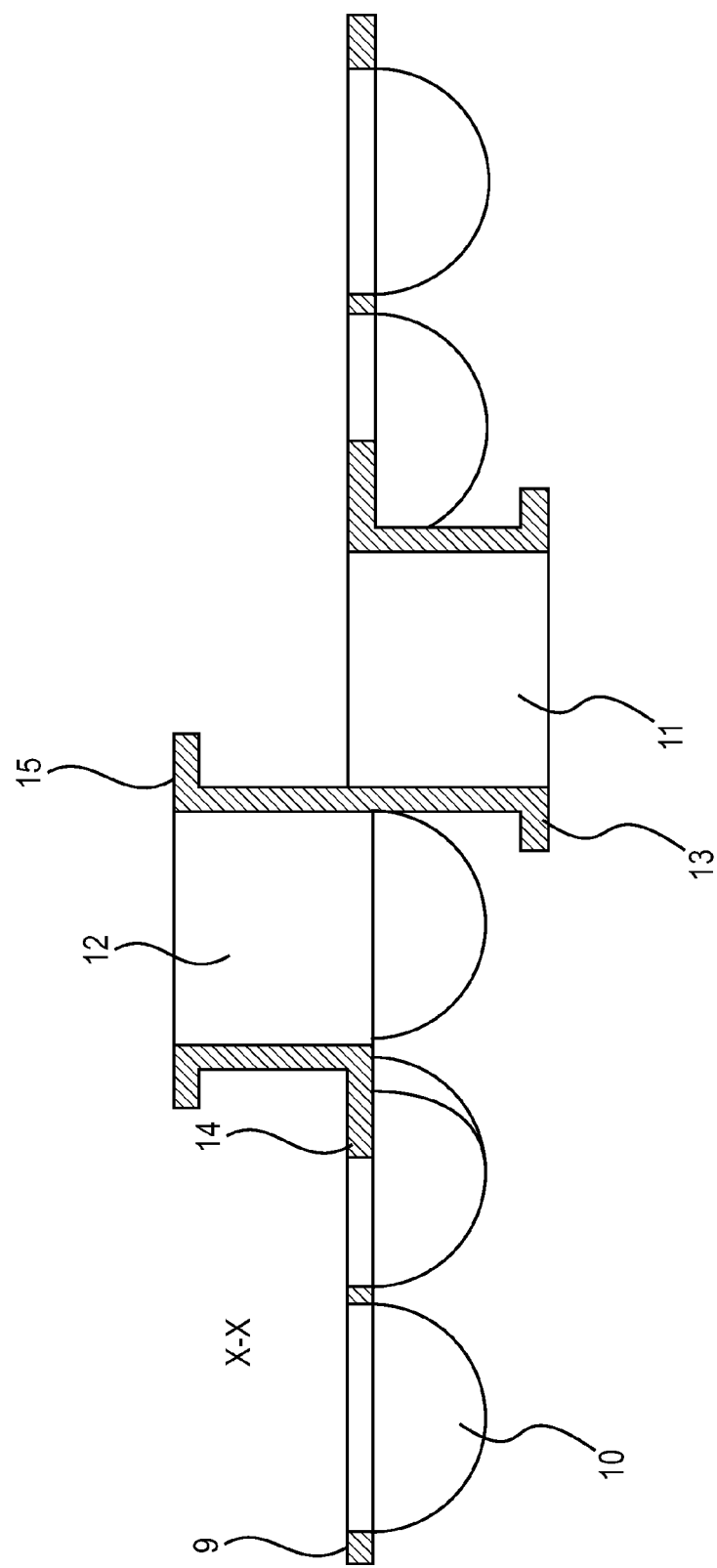
FIG. 5 is a cross sectional view of the spacer grid taken trough line X-X in FIG. 4.

A support grid 9 (also referred to as a support grid) is disposed between the first media 7 and the second media 8. Either unitary with or adjacent to the support grid 9 are disposed support ribs 10. The support grid 9 also has, either unitary with or adjacent to the support grid 9, flanges (discussed below) that create a first fluid channel 11 and a second fluid channel 12. The channels 11 and 12 are defined by openings formed by a first filter flange 13, a second filter flange 14, and a third filter flange 15. An example of flanges 13, 14, 15 are illustrated in more detail in FIGS. 2, 3, 4 and 5. FIG. 2 is a perspective view of a first embodiment of a spacer grid 9 with flanges. FIG. 3 is a perspective view of a first embodiment of a spacer grid 9 with flanges, taken from the opposite side as FIG. 2. FIG. 4 is a top view of the spacer grid. FIG. 5 is a cross sectional view of the spacer grid 9 taken trough line X-X in FIG. 4.

FIG. 1 also shows a fixing area 16 for the filter media, and a coupling flange 19 on the upper cover 3 and a coupling flange 20 on the base part 19. The coupling flanges 19 and 20 have mating surfaces that are attached to each other by suitable means, such as for example adhesive bonding, vibration welding, laser welding or other attachment means.

Figure 6:
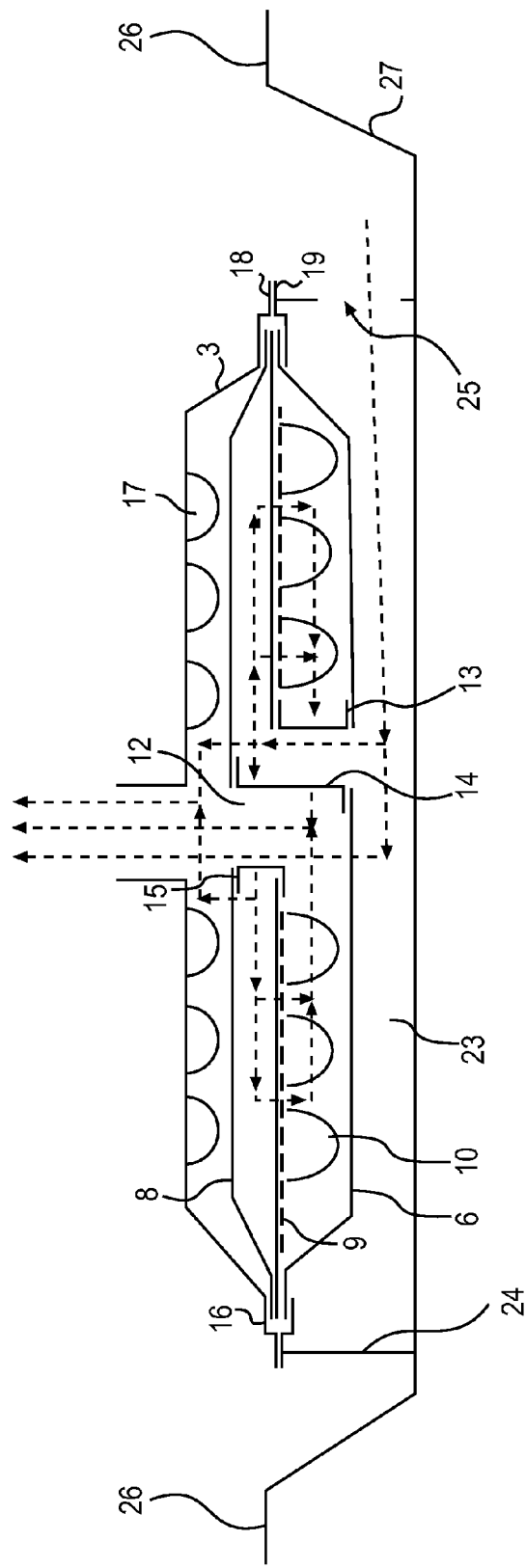
FIG. 6 is a side cross-sectional schematic view of a filter according to a second embodiment, with the lower cover not needed and the filter mounted to an oil pan having a mounting flange with an inlet.

FIG. 6 is a side cross-sectional schematic view of a filter according to a second embodiment, with the lower cover not needed and the filter mounted to an oil pan 26 having a circumferential mounting flange 24 with an inlet 25 defined by an opening in the flange 24. The oil pan 26 has a depression flange 27 that forms a recess in which the filter 10 sits. It will be appreciated that this embodiment can provide a reduced depth by omitting the base cover 2, and instead using the depression flange 27 effectively as a base cover. In this embodiment the mounting flange 27 has the base part coupling flange 19.

Figure 7:
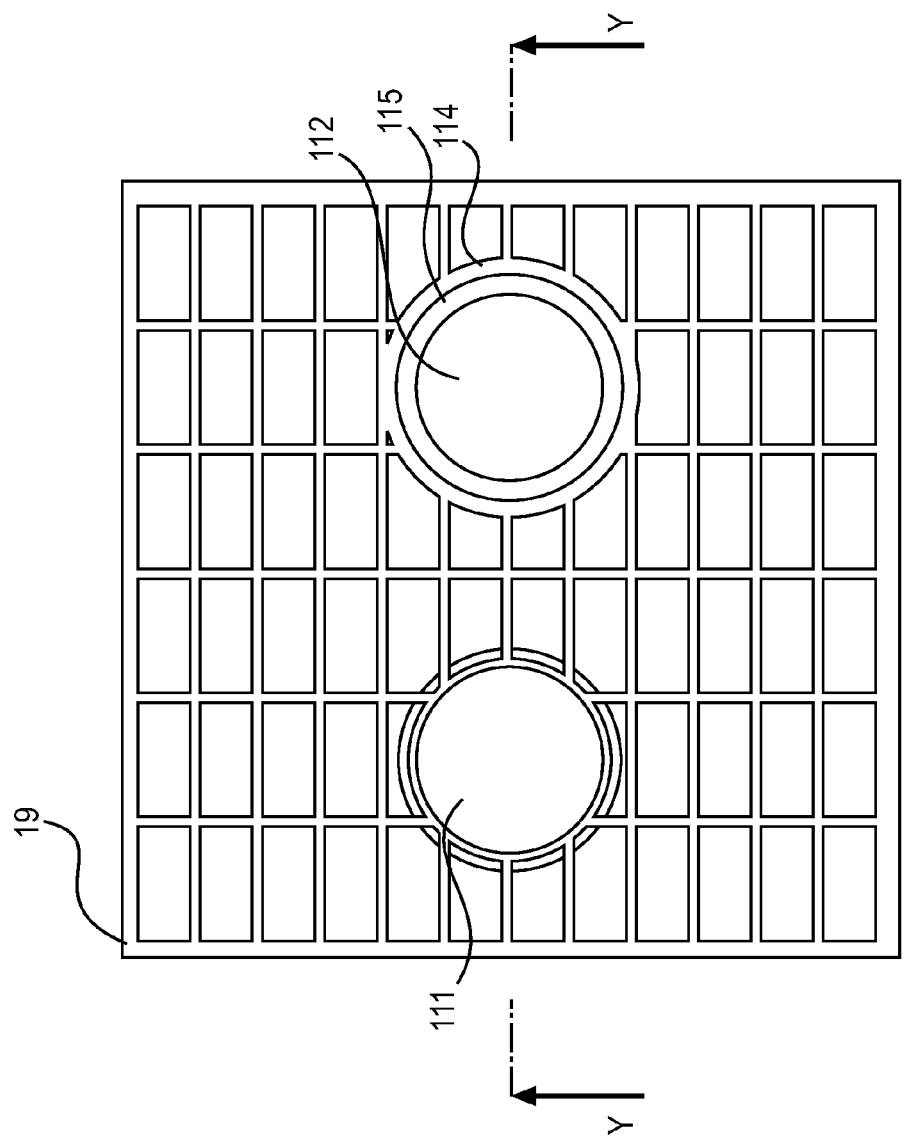
FIG. 7 is a top view of an alternative spacer grid.
Figure 8:
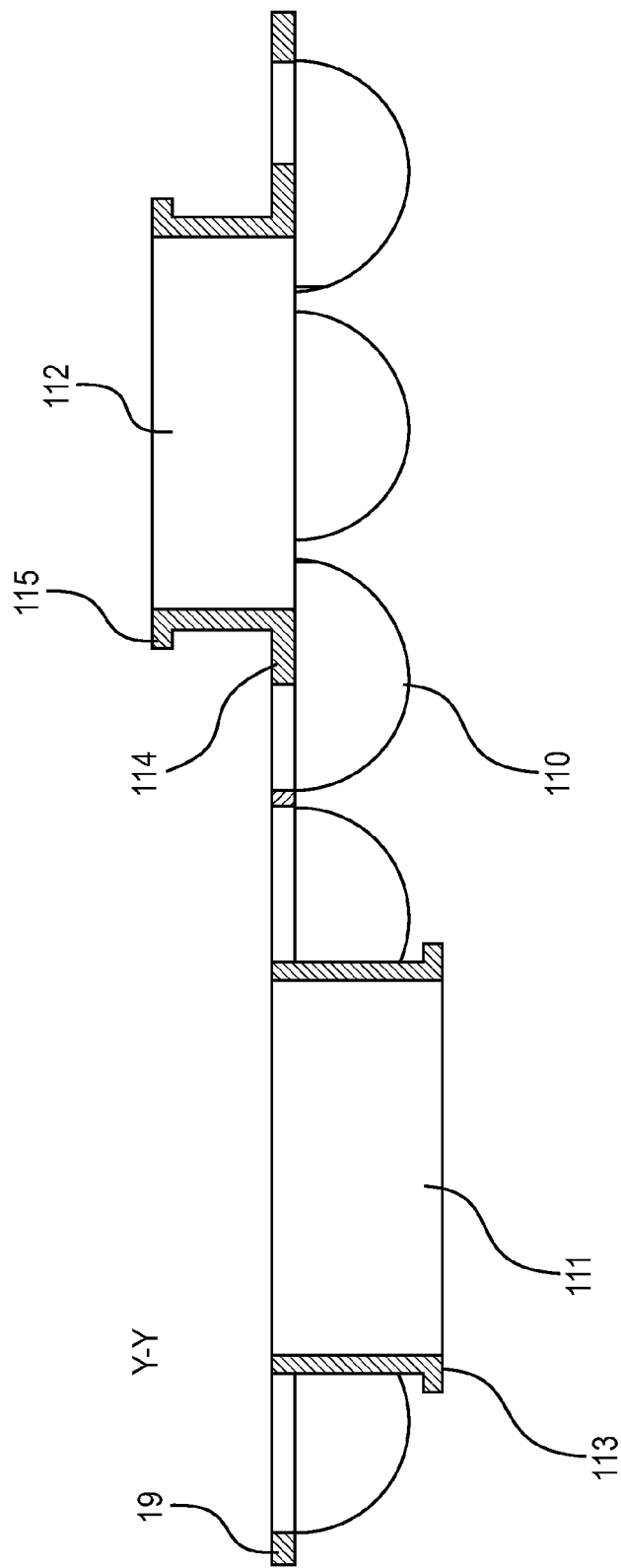
FIG. 8 is a cross sectional view of the alternative spacer grid taken through line Y-Y in FIG. 7.

FIG. 7 is a top view of an alternative spacer grid. FIG. 8 is a cross sectional view of the alternative spacer grid taken through line Y-Y in FIG. 7. This embodiment shows an alternative arrangement of a spacer grid 19, having fluid channels 111 and 112, generally having a function similar to channels 11 and 12; and flanges 113, 114, 115, generally having a function similar to flanges 12, 14 15.

Figure 9:
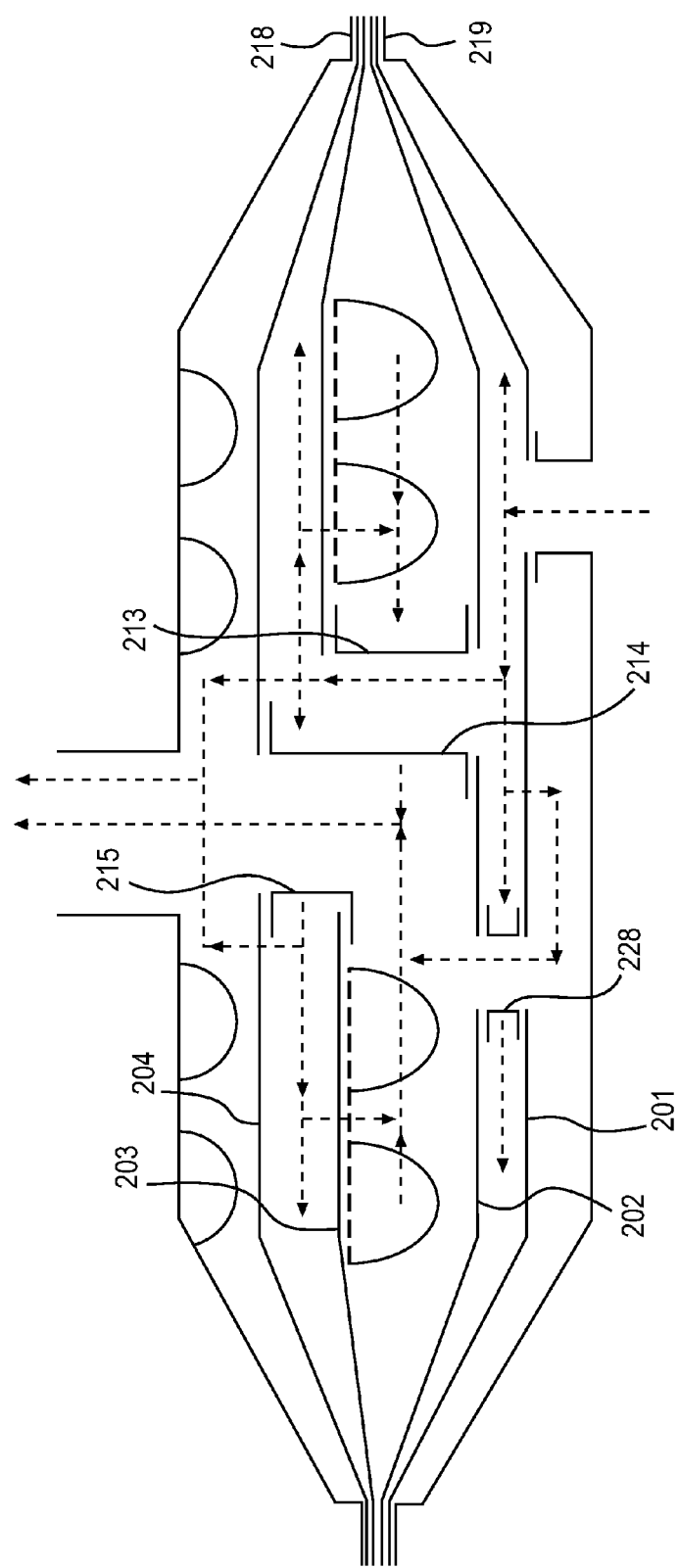
FIG. 9 is a side cross-sectional schematic view of a filter according to a third embodiment.

FIG. 9 is a side cross-sectional schematic view of a filter according to a third embodiment. This embodiment has several components similar to the first or second embodiments. However the media include a first pair of media 201 and 201 and a second pair of medial 203 and 204. In the example illustrated the media 201 and 202 form an enclosed "bag", and media 203 and 204 form another "bag". The bags may consist of folder over media that is sealed around its peripheral seams and is mounted via coupling flanges 218 and 219. Alternatively the media 201, 202, 203, 204 may each be flat sheets, or one pair of media may form a bag while the other two media are flat sheets, or the four media may be formed as one bag inside another bag. Flanges 213, 214, 215 are similar to flanges 13, 14, 15, and an extra fourth flange is present between filter media 201 and 202.

Figure 10:
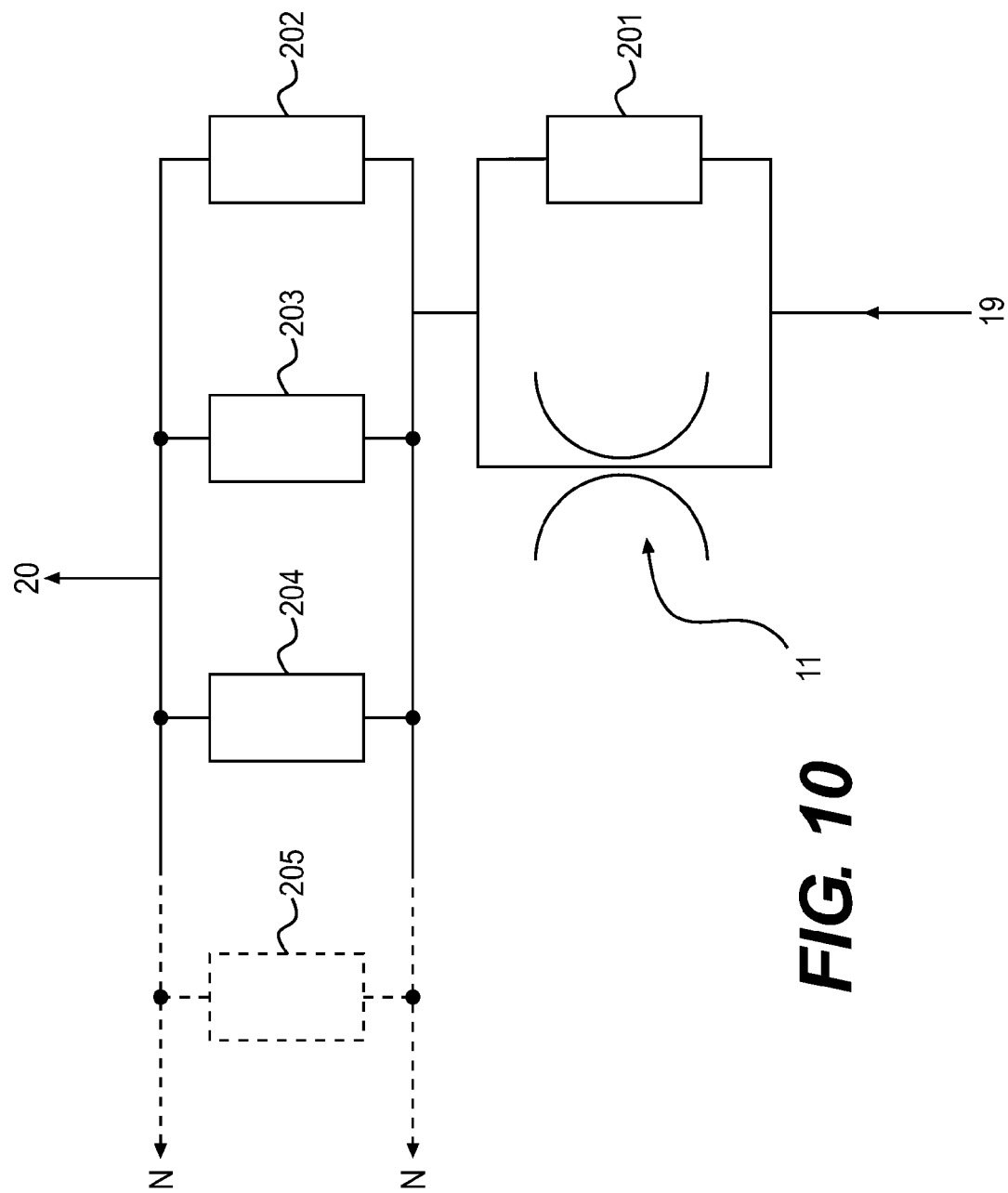
FIG. 10 schematically illustrates embodiments having four, or more than four, filtration layers.

FIG. 10 schematically illustrates embodiments having four, or more than four, filtration layers. Besides filter path 11, media 201, 202, 203, 204 are shown. An additional media 205 is shown. Further the broken lines N refer to paths to additional media (any number of following additional media).

The various media in some embodiments can all be different from one another. Alternatively, all media could be the same. Alternatively, some media can the same as each other while some are different from others. The reference here to same or different can include various media characteristics, such as for example, material of media, filtration density of media, permeability, efficiency and/or general type of media.

Further, when referring to media, it is to be understood that media can have different qualities such as filtration "density," which can be defined as including a least: permeability (pressure drop), and/or efficiency (particle removal effectiveness as a function of size of particle). These are different measures of different qualities, attributes or characteristics of media; the qualities or characteristics can sometimes be related to each other or different for a given media, depending on the media and the measurement parameters. Various media can also be of different materials. Further various media can be referred to as different types or grades. This can include differences in any one or more of the above qualities, attributes or characteristics.

A benefit of some embodiments described in this application is that the resulting filter structure according to certain embodiments optimizes the pressure drop distribution, which is achieved by shorter fluid tracks and fluid paths than in prior systems. For example these embodiments of the invention may provide a better pressure drop distribution compared to a single bag filter system, or a bag system with a single layer, such as that described in US 2012/001257 A1. A benefit of some embodiments is the ability to minimize the flow paths by applying fluid channels between the filtration media layers. The support grids ensure that the layers have a defined space to the next layer, and that the fluid never has to pass one filtration layer (filtration media) right after another. The individually placeable inlet 11 and the outlet channel 12 can be placed right next to the filter inlet 4 or filter outlet channel 5. The combination of these three features (channels between medias, support grids that provide space between the layers, individually placeable channels 11, 12, etc. minimize the flow paths and therefore the pressure drop of the whole filter system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A fluid filter, comprising:
a housing having an inlet and an outlet;
a support grid disposed within the housing;

first, second, and third mounting flanges disposed within the housing; and first, second, and third media disposed within the housing, the first media comprising a first aperture there through, the second media comprising a second aperture there through, and the third media comprising a third aperture there through;

wherein:

said first, second, and third mounting flanges are unitary with or adjacent to the support grid;

the first mounting flange spaces the first and second media apart;

the second mounting flange spaces the first and third media apart;

the third mounting flange spaces the second and third media apart;

the first and third flanges form a first flow channel from the inlet to a fluid space between the second media and the third media; and the second and third flanges form a second flow channel from a fluid space between the first media and the second media to the outlet.

2. The fluid filter of claim 1, wherein the first, second, and third media each comprise different filter materials from each other.

3. The fluid filter of claim 1, wherein the second media is of a finer media material than the material of the first media.

4. The fluid filter of claim 3, wherein the third media is of a finer media material than the material of the second media.

5. The fluid filter of claim 1, wherein the first, second, and third flanges are adjacent to the support grid.

6. The fluid filter of claim 1, wherein the first, second, and third flanges are unitary with the support grid.

7. The fluid filter of claim 1, further comprising support ribs that are unitary with the support grid.

8. The fluid filter of claim 3, wherein the second media is disposed upstream of the first media.

9. The fluid filter of claim 1, wherein the housing comprises an upper cover having the outlet, and a base cover having the inlet.

10. The fluid filter of claim 1, further comprising an oil pan, wherein the housing comprises an upper cover and a portion of the oil pan.

11. The fluid filter of claim 10, wherein the oil pan has a mounting flange defining a portion of the housing, and having an inlet port in the mounting flange.

12. The fluid filter of claim 9, further comprising a fourth mounting flange unitary with or adjacent to the support grid, and a fourth media having a fourth aperture there through, wherein the fourth mounting flange flows a flow channel between the fourth media and the base cover to a region between the first and second media.

13. The fluid filter of claim 12, wherein the fourth mounting flange is unitary with the support grid.

14. The fluid filter of claim 1, wherein at least one of the first, second, and third media are of different filter density from at least one other of the first, second, and third media.

15. The fluid filter of claim 1, wherein at least one of the first, second, and third media are of different filter material type from at least one other of the first, second, and third media.

16. The fluid filter of claim 1, wherein at least two of the first, second, and third media are at least partially of the same material type as each other.

17. The fluid filter of claim 1, wherein at least two of the first, second, and third media are of the same filtration density.

18. The fluid filter of claim 1, wherein all of the first, second, and third media are of different filtration densities from each other.

* * * * *